United States Patent [19]

Snyder et al.

[11] 3,849,081

[45] Nov. 19, 1974

[54] POLYBUTADIENE COMPOSITIONS AND HYDROCARBONS THICKENED THEREWITH

[75] Inventors: Amandus D. Snyder; William K. Taft, both of Lewiston, N.Y.

[73] Assignee: Olin Mathieson Chemical Corporation, New Haven, Conn.

[22] Filed: July 22, 1959

[21] Appl. No.: 828,918

[52] U.S. Cl. .................... 44/7 E, 44/7 C, 260/94.2, 260/94.3
[51] Int. Cl. .............................................. C10l 7/02
[58] Field of Search ...... 44/7 E, 7 C; 260/815, 94.2, 260/94.3

[56] References Cited
UNITED STATES PATENTS

| | | | |
|---|---|---|---|
| 2,623,032 | 12/1952 | Banes | 260/45.4 |
| 2,676,951 | 4/1954 | McCracken et al. | 260/82.3 |
| 2,682,336 | 6/1954 | Moberly | 206/84 |
| 3,692,504 | 9/1972 | Jones et al. | 44/7 E |

Primary Examiner—Leland A. Sebastian
Attorney, Agent, or Firm—Eugene Zagarella, Jr.; Walter D. Hunter

[57] ABSTRACT

1. A polybutadiene composition obtained by adding to a latex, produced by emulsion polymerization of butadiene wherein the conversion of butadiene to polybutadiene is about 55 to 65 percent, from about 0.2 to 0.4 parts by weight of a acrylonitrile per 100 parts by weight of butadiene within a period of about 3 to 25 minutes prior to shortstopping the emulsion polymerization of the butadiene.

2. An incendiary gel consisting essentially of a liquid hydrocarbon thickened with from about 2 to about 10 percent by weight based upon the weight of the incendiary gel of the product obtained by adding to a latex, produced by emulsion polymerization of butadiene wherein the conversion of butadiene to polybutadene is about 55 to 65 percent, from about 0.2 to 0.4 parts by weight of acrylonitrile per 100 parts by weight of butadiene within a period of about 3 to 25 minutes prior to shortstopping the emulsion polymerization of the butadiene.

2 Claims, No Drawings

POLYBUTADIENE COMPOSITIONS AND HYDROCARBONS THICKENED THEREWITH

This invention relates to polybutadiene compositions and to a method for their preparation. In particular, it is concerned with the preparation of a polybutadiene composition having a high and stable absorption factor for hydrocarbons. The polymer thus produced, when swollen in, for example, gasoline, is useful as a fuel for flame throwers.

The general principle used in flame throwers is to eject a fuel from a nozzle at high pressure and immediately ignite the fuel as it leaves the nozzle. The objective is to deliver a large quantity of burning material onto the target in such form that it will stick as a large mass and burn as long as possible. Fuels vary in consistency from that of gasoline to a semi-solid gel. Thickened fuels, if sufficiently volatile for good ignition, give ranges at least double those obtainable with unthickened fuels. Thickened fuels are more suitable for use in flame throwers than unthickened fuels for the additional reasons that they remain as a rod rather than breaking up in the air, are less affected by adverse winds, and produce good target effect.

The physical properties of the thickening agent are very important in producing a desirable fuel. If a high concentration of thickening agent is required to obtain the necessary viscosity of the mixture, the rod will not burn. If the concentration is too low and the viscosity of the gel is too low, most of the fuel burns in flight, or scatters and does not arrive at the target.

Thickening agents which have been employed in flame-thrower fuels include viscous petroleum products, rubber, aluminum soaps and, more recently, high gel polybutadiene. A high gel polybutadiene when swollen in gasoline (approximately 4 percent by weight polymer in gasoline) has satisfactory burning and adhesion characteristics when ignited and fired as a rod from a flame thrower and gives approximately fifty per cent or greater improvement in firing range over aluminum soaps. The properties of the polybutadiene that appear to relate to the proper balance of solubility in gasoline, swelling of the gel, and cohesion of the gel particles have been characterized by the per cent gel, the molecular weight of the sol in the polymer, and the absorption factor. Measurements of the gel content and dilute solution viscosity (DVS), which is related to molecular weight of the sol, are made in benzene, with specifications of 80± 10 per cent gel and 1.7±0.6 DSV.

The absoprtion factor is the weight of benzene held per gram of polymer when 5 grams of polymer are mixed with 350 grams of benzene for 24 hours, and the unsorbed solvent filtered off. The relationship between the results in benzene and gasoline has been found to be 1.8, that is 1.8 times as much benzene is sorbed by the rubber than is gasoline. In a satisfactory flame thrower liquid it is necessary to maintain the proper balance of the gellation property, adhesion property and gasoline absorption property.

Polybutadiene polymers of this type, however, tend to change in their adhesion and gasoline absorption properties during storage at ambient or higher temperature. The changes in these properties can be measured by changes in gel, dilute solution viscosity and absorption factor. The polybutadiene composition of this invention on the other hand, retains its absorption factor during storage to an increased extent compared with similar polymer made by other processes.

The polybutadiene compositions of this invention are obtained by adding to a latex, produced by emulsion polymerization of butadiene wherein the conversion of butadiene to polybutadiene is about 55 to 65 percent, from about 0.2 to 0.4 parts by weight of acrylonitrile per 100 parts by weight of butadiene within a period of about 3 to 25 minutes prior to shortstopping the emulsion polymerization of the butadiene.

The invention is illustrated in detail by the following examples, which are to be considered not limitative. The polybutadiene compositions of these examples were produced in new equipment made of 316- stainless steel or in vessels lined with glass or pheno-flex plastic.

EXAMPLE I

The butadiene was washed with caustic, the caustic drained off, then washed with water and the water was drained off. The butadiene so treated was practically free of the inhibitor, tertiary butyl catechol.

The following was the charge formula used, based on 1300 pounds of 100 per cent butadiene:

| Ingredient | Part by Weight |
| --- | --- |
| Butadiene | 100 |
| Water (total) | 180 |
| Potassium fatty acid soap | 4.7 |
| Modifier (dodecylmercaptan) | 0.08 |
| Trisodium phosphate dodecahydrate | 0.55 |
| Cumene hydroperoxide | 0.10 to 0.125 |
| Activator: | |
| Ferrous sulphate heptahydrate | 0.09 to 0.11 |
| Potassium pyrophosphate | 0.20 to 0.25 |
| Dextrose | 0.76 to 0.95 |

The soap and the trisodium phosphate were dissolved together in water added to the reactor, cooled to 41°F. and the butadiene was added. The activator was added, followed by the modifier, and the whole was cooled to 41°F. The reaction was initiated by adding the cumene hydroperoxide. The reaction was followed by determination of total solids to give conversions between 59.6 ± 4.7 per cent. At this point, acrylonitrile (0.25 parts per 100 parts monomer) was added as a stabilizer in the "as received" condition, and the latex was mixed 5 minutes. It was then transferred to a stripper to which 0.12 to 0.15 part of shortstop (sodium dimethyldithiocarbamate-sodium polysulfide mixture) had been previously added. The latex was heated under vacuum by steam in two small coils and by the direct addition of steam into the bottom of the stripper. The latex, when free of butadiene, was transferred either to the blend tank or directly to the coagulation tank. Versene Fe-3, (0.05 to 0.10 per cent based on solids present) and phenyl beta naphthylamine (1.5 per cent based on solids present) were added and mixed. (Versene Fe-3 is the registered trade name of a product consisting of approximately 90 percent of the tetrasodium salt of ethylenediaminetetracetic acid, technical, and 10 percent of the monosodium salt of N,N-di(2-hydroxyethyl) glucine, technical). Sodium bicarbonate (4.0 per cent based on the solids present) was added as a 13 per cent solution, then sodium chloride (40 to 44 per cent based on the solids present) was added as a 10 or 25 per cent solution to give a fine cream, and then sulfuric acid as a 2 per cent solution was added to result in a pH of from 2.0 to 3.0. After soap conversion, the serum was drained off and the crumb washed 4 times with city water. The crumb was dried in a tray drier at 140°F., put through a hammer mill, screened through a 4 mesh screen, blended and packaged. The analysis of a typical batch is presented in Table I.

the Versene Fe-3 was used to reduce the oxidative breakdown of the polymer by chelating the ferric ion which is present in the system.

The results of absorption tests on samples of Examples II-V before and after heat aging are shown in Table II.

TABLE II

| Polymer | Additive | Original | | Aged at 140°F. | | | |
|---|---|---|---|---|---|---|---|
| | | | | 24 hours | | 48 hours | |
| | | Absorption Factor | Gel Content | Absorption Factor | Gel Content | Absorption Factor | Gel Content |
| Example II | PBNA, 1 % Acrylonitrile, 0.2 pt. (a) | 47 | 84 | 26 | 86 | 24 | 84 |
| Example III | PBNA, 1 % | 46 | 79 | 25 | 82 | 25 | 81 |
| Example IV | PBNA, 1 % Versene Fe-3, 0.2 pt. | 46 | 83 | 25 | 83 | 24 | 80 |
| Example V | PBNA, 1 % Acrylonitrile, 0.2 pt (added to latex before shortstop; Versene Fe-3, 0.2 pt. added prior to coagulation) | 49 | 82 | 45 | 82 | 38 | 80 |

(a) Added subsequent to shortstopping.

TABLE I

| PROPERTY | EXAMPLE I |
|---|---|
| Particle size | |
| on 4 mesh | 0 |
| on 8 mesh | 8 |
| on 20 mesh | 51 |
| Gel content, per cent | 78 |
| Dilute solution viscosity | 1.74 |
| Ash, per cent | 0.5 |
| Soap, per cent | 0.3 |
| Stabilizer, per cent | 1.5 |
| Volatile, per cent | 0.35 |
| Solvent absorption no. (a) | 36 |
| Solvent absorption factor | 60 |

(a) Solvent absorption number results from a 5 minute test.

EXAMPLE II

In this example, the procedure was the same as was employed in Example I except that the acrylonitrile (0.2 parts per 100 parts monomer) was added subsequent to shortstopping.

EXAMPLES III-V

In these examples the polymers were prepared in a 5-gallon reactor in a manner similar to that used in Example I, except that a charge factor of 47.0 grams per part in Examples II to V was used and the method of stripping was adapted to the smaller quantity of materials present. Note that in Examples III and IV, no acrylonitrile was added either prior or subsequent to shortstopping.

Although the addition of phenyl beta naphthylamine (PBNA) and Versene Fe-3 alone or together without acrylonitrile did not result in a product with a stable absorption factor, they were nevertheless employed in the production of the polymer of Example V. The phenyl beta naphthylamine was added as a standard rubber anti-oxidant to prevent resinification of the rubber, while The polybutadiene compositions of Examples I and V can be incorporated in any suitable liquid hydrocarbon, such as gasoline (leaded or unleaded), benzene, naphtha, petroleum ether, Stoddard's solvent, kerosine and diesel oil, to provide an incendiary gel useful as a fuel for flame throwers. In general the polybutadiene composition comprises about 2 to 10 per cent by weight based on the weight of the incendiary gel. The amount of the polybutadiene composition used in forming the incendiary gel varies depending upon the nature of hydrocarbon liquid employed. Where gasoline is employed, the amount of polybutadiene composition is about 4 weight per cent based on the weight of gasoline. For further details as to incendiary gel preparation, see U.S. Pat. No. 2,606,107 to Fieser.

We claim:

1. A polybutadiene composition obtained by adding to a latex, produced by emulsion polymerization of butadiene wherein the conversion of butadiene to polybutadiene is about 55 to 65 percent, from about 0.2 to 0.4 parts by weight of acrylonitrile per 100 parts by weight of butadiene within a period of about 3 to 25 minutes prior to shortstopping the emulsion polymerization of the butadiene.

2. An incendiary gel consisting essentially of a liquid hydrocarbon thickened with from about 2 to about 10 percent by weight based upon the weight of the incendiary gel of the product obtained by adding to a latex, produced by emulsion polymerization of butadiene wherein the conversion of butadiene to polybutadene is about 55 to 65 percent, from about 0.2 to 0.4 parts by weight of acrylonitrile per 100 parts by weight of butadiene within a period of about 3 to 25 minutes prior to shortstopping the emulsion polymerization of the butadiene.

* * * * *